US012794376B2

(12) United States Patent
Ekong et al.

(10) Patent No.: US 12,794,376 B2
(45) Date of Patent: Nov. 10, 2026

(54) CONTROL DEVICE, POWER CONVERSION DEVICE, AND CONTROL METHOD

(71) Applicant: TMEIC Corporation, Tokyo (JP)

(72) Inventors: Ufot Ufot Ekong, Tokyo (JP); Takumi Ito, Tokyo (JP); Masashi Nakamura, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/726,289

(22) PCT Filed: Nov. 18, 2022

(86) PCT No.: PCT/JP2022/042826
§ 371 (c)(1),
(2) Date: Jul. 2, 2024

(87) PCT Pub. No.: WO2024/105876
PCT Pub. Date: May 23, 2024

(65) Prior Publication Data
US 2026/0261212 A1 Sep. 3, 2026

(51) Int. Cl.
*H02M 5/458* (2006.01)
*H02M 7/537* (2006.01)

(52) U.S. Cl.
CPC ........... *H02M 5/458* (2013.01); *H02M 7/537* (2013.01)

(58) Field of Classification Search
CPC .................. H02M 5/45–458; H02M 7/00–537
See application file for complete search history.

(56) References Cited

U.S. PATENT DOCUMENTS 9,270,160 B2 * 2/2016 Chen ......................... H02J 9/00
9,276,498 B2 * 3/2016 Lin ......................... B60L 8/003
(Continued)

FOREIGN PATENT DOCUMENTS

EP 4213370 B1 * 3/2026 ............. H02P 21/22
JP 6-168003 A 6/1994
JP 2004357442 A * 12/2004

*Primary Examiner* — Crystal L Hammond
*Assistant Examiner* — Nicholas Alden Chapa Mills
(74) *Attorney, Agent, or Firm* — Knobbe, Martens, Olson & Bear, LLP

(57) ABSTRACT

A control device according to an embodiment is a control device of a power conversion device acquired by combining a converter converting an AC power into a DC power and an inverter converting a DC power into an AC power. The control device described above includes a DC voltage controller, a compensation calculator, a controller, and a stabilization controller. The DC voltage controller described above performs a proportional operation and an integration operation for a DC voltage deviation that is a deviation between a DC voltage detection value relating to the DC voltage of the DC side of the converter described above and a DC voltage reference of the DC side described above and generates an output value using results of the proportional operation described above and the integration operation described above. The compensation calculator described above adjusts a compensation amount used for inhibiting variations of the DC voltage described above using a request output value of the inverter. The control unit described above controls the amount of conversion in the converter described above using the operation result based on the generated output value described above and the adjusted compensation amount described above. In a case in which predetermined conditions relating to the magnitude of the DC voltage deviation described above and the result of the integration operation described above are satisfied, the sta- (Continued)

bilization controller described above changes the result of the integration operation described above to a value smaller than the absolute value of the result of the integration operation described above.

10 Claims, 6 Drawing Sheets

(56) References Cited

U.S. PATENT DOCUMENTS

| | | | | |
|---|---|---|---|---|
| 10,224,830 | B2 * | 3/2019 | Basic | H02M 1/143 |
| 2025/0167704 | A1 * | 5/2025 | Harada | H02P 21/22 |

* cited by examiner

CONTROL DEVICE, POWER CONVERSION DEVICE, AND CONTROL METHOD

TECHNICAL FIELD

An embodiment of the present invention relates to a control device, a power conversion device, and a control method.

BACKGROUND ART

In a power conversion device acquired by combining a converter (a power converter) and an inverter, DC sides of the converter and the inverter may be connected to each other. A DC power generated by the converter is converted into an AC power by the inverter. In accordance with variations of a load driven by the inverter, a DC voltage of the inside of the power conversion device may change. In accordance with this, there are cases in which control of the power conversion device becomes unstable.

CITATION LIST

Patent Document

[Patent Document 1]
Japanese Unexamined Patent Application, First Publication No. H6-168003

SUMMARY OF INVENTION

Technical Problem

An objective of the present invention is to provide a control device, a power conversion device, and a control method capable of further stabilizing a DC voltage of a power conversion device in which a converter and an inverter are combined.

Solution to Problem

A control device according to an embodiment is a control device of a power conversion device acquired by combining a converter converting an AC power into a DC power and an inverter converting a DC power into an AC power. The control device described above includes a DC voltage controller, a compensation calculator, a controller, and a stabilization controller. The DC voltage controller described above performs a proportional operation and an integration operation for a DC voltage deviation that is a deviation between a DC voltage detection value relating to the DC voltage of the DC side of the converter described above and a DC voltage reference of the DC side described above and generates an output value using results of the proportional operation described above and the integration operation described above. The compensation calculator described above adjusts a compensation amount used for inhibiting variations of the DC voltage described above using a request output value of the inverter. The control unit described above controls the amount of conversion in the converter described above using the operation result based on the generated output value described above and the adjusted compensation amount described above. In a case in which predetermined conditions relating to the magnitude of the DC voltage deviation described above and the result of the integration operation described above are satisfied, the stabilization controller described above changes the result of the integration operation described above to a value smaller than the absolute value of the result of the integration operation described above.

DESCRIPTION OF EMBODIMENTS

Hereinafter, a control device, a power conversion device, and a control method according to an embodiment will be described with reference to the drawings. In the following description, the same reference sign will be assigned to components having the same function or functions similar to each other. Duplicate description of such components may be omitted. In addition, being electrically connected may be simply referred to as "being connected".

Figure 1:
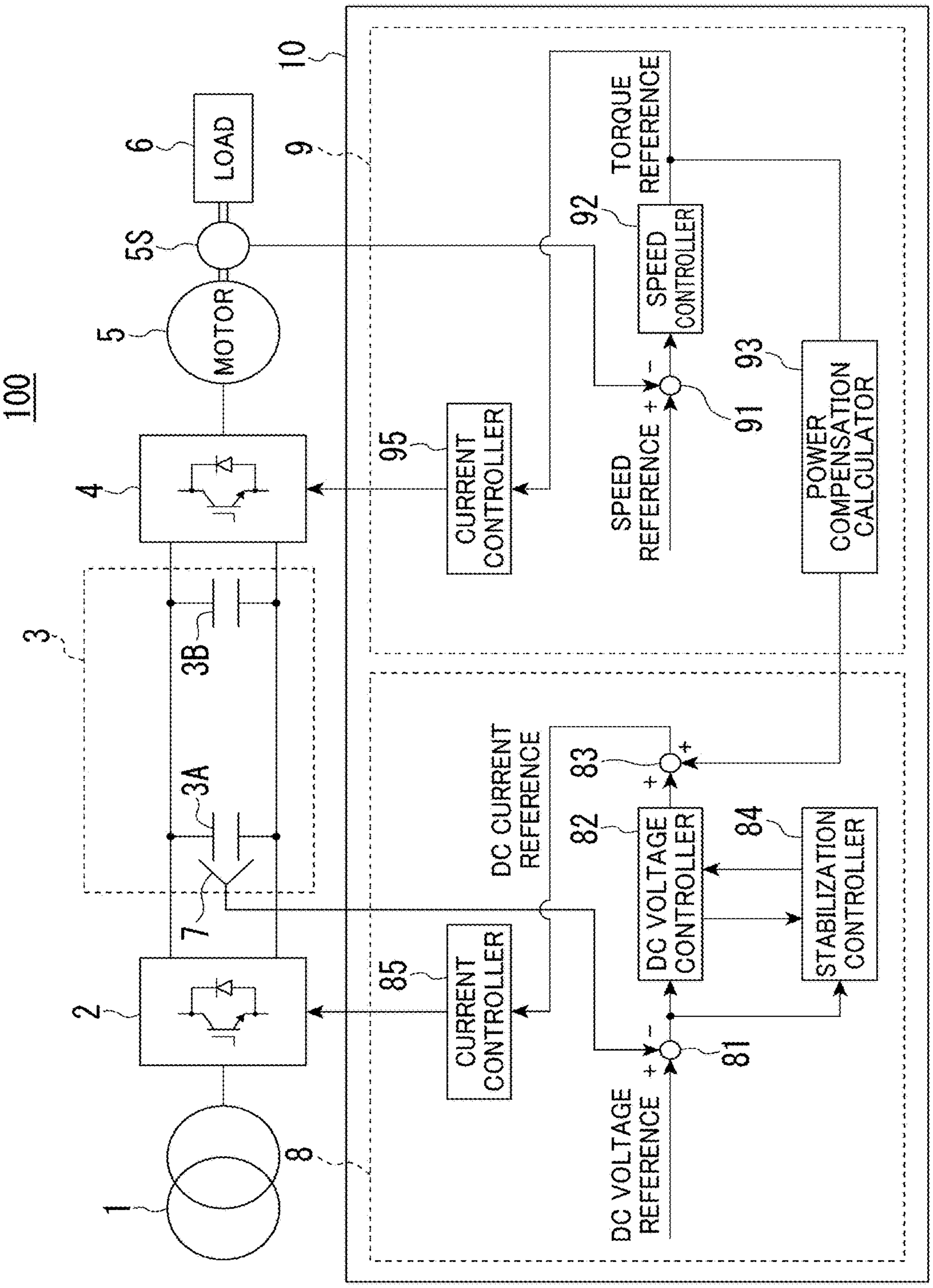
FIG. 1 is a bird's eye view of a drive system to which a phase angle detecting system according to an embodiment is applied.

FIG. 1 is a configuration diagram of a power conversion device 100 according to an embodiment.

In addition to the power conversion device 100, an input transformer 1, a motor 5, and a load 6 relating to the power conversion device 100 are illustrated in FIG. 1.

First, an overview of the power conversion device 100 will be described.

The power conversion device 100, for example, includes a converter 2, a smoothing capacitor 3, an inverter 4, a DC voltage detector 7, and a control device 10. Positive electrodes and negative electrodes of DC sides of the converter 2 and the inverter 4 are respectively connected to each other through a DC link. The smoothing capacitor 3 is disposed in this DC link.

For example, an AC is supplied from a secondary side of the input transformer 1 to the converter 2, and the converter 2 converts this into a DC and supplies the DC to the smoothing capacitor 3. In addition, the smoothing capacitor 3 may be configured to be disposed with being divided into a smoothing capacitor 3A of the converter 2 side and a smoothing capacitor 3B of the inverter 4 side. For example, in accordance with conversion performed by the converter 2, a voltage change occurs in the DC link. A part thereof is smoothed by the smoothing capacitor 3. A DC voltage smoothed by the smoothing capacitor 3 is supplied to the inverter 4.

The inverter 4 converts this DC voltage into an AC voltage, thereby driving the motor 5. The voltage applied to the smoothing capacitor 3 is detected by the DC voltage detector 7 that is used for feeding back a voltage.

In accordance with this, the inverter 4 converts a part of the DC power generated by the converter 2 into an AC power. The inverter 4 supplies the AC power to the motor 5.

A speed detector 5S used for feeding back a speed is attached to a shaft of the motor 5. The load 6 of which a torque changes in accordance with a use status is connected to the shaft of the motor 5.

Hereinafter, a more specific example will be illustrated, and details of units of the power conversion device 100 will be described.

The converter 2 includes a plurality of switching elements such as an IGBT, a MOSFET, and the like and, for example, is configured as a so-called active converter configured by performing bridge connection of the switching elements. The converter 2 is controlled by a converter control unit 8 such that a voltage of the DC link, that is, a DC output voltage becomes constant.

The inverter 4 includes a plurality of switching elements such as an IGBT, a MOSFET, and the like and, for example, is configured as a so-called active converter configured by performing bridge connection of the switching elements. The inverter 4 and the converter 2 may have configurations that are based on systems similar to each other or may have configurations that are based on mutually-different systems. Known configurations may be applied to the configurations of the inverter 4 and the converter 2.

The inverter 4, for example, is controlled by an inverter control unit 9 such that the speed of the motor 5 becomes a predetermined value. In addition, the converter control unit 8 and the inverter control unit 9 may be configured altogether as the control device 10. Hereinafter, internal configurations of the converter control unit 8 and the inverter control unit 9 will be described.

The converter control unit 8, for example, includes a subtractor 81, a DC voltage controller 82, an adder 83, a stabilization controller 84, and a current controller 85 (controller).

In the converter control unit 8, a voltage feedback signal detected by the DC voltage detector 7 is subtracted from a DC voltage reference Vdc* by the subtractor 81. The subtractor 81 supplies a deviation thereof (it will be referred to as a DC voltage deviation ΔVdc) to the DC voltage controller 82. The DC voltage controller 82 performs PI control for this DC voltage deviation ΔVdc, outputs a current reference such that the DC voltage deviation ΔVdc decreases, and supplies this to one input of the adder 83. A power compensation signal is supplied to the other input of the adder 83 from the inverter control unit 9 to be described below. Then, the adder 83 supplies an output signal thereof, that is, the compensated current reference to the current controller 85. The current controller 85, for example, performs first PWM control such that a deviation between this current reference and a converter current feedback not illustrated in the drawings (it will be referred to as a DC current deviation) decreases to perform on/off control of switching elements configuring the converter 2. The stabilization controller 84 acts inside the converter control unit 8 such that a variation of a DC voltage of the DC link due to a variation in the load 6 is inhibited. Details of the stabilization controller 84 will be described below.

The inverter control unit 9, for example, includes a subtractor 91, a speed controller 92, a power compensation calculator 93 (compensation calculator), and a current controller 95.

In the inverter control unit 9, a speed feedback signal detected by a speed detector 5S is subtracted from a speed reference by the subtractor 91, and a deviation thereof (it will be referred to as a speed deviation) is supplied to the speed controller 92. The speed controller 92 performs PI control for this speed deviation, outputs a torque reference for decreasing the speed deviation, and supplies the torque reference to the current controller 95. The torque reference described here, for example, corresponds to a current reference of a torque axis in a case in which vector control is performed. The current controller 95 generates a voltage reference (it will be referred to as an AC voltage reference) based on this torque reference and a result detected by a transformer CT not illustrated in the drawing and outputs an AC voltage reference adjusted such that a deviation from an inverter output current feedback (it will be referred to as an AC current deviation) decreases. The current controller 95, for example, performs second PWM control such that a difference between an output voltage of the inverter 4 and this AC voltage reference decreases and performs on/off control of switching elements configuring the inverter 4.

The torque reference described above is supplied to the power compensation calculator 93. The power compensation calculator 93 generates a power compensation signal using this torque reference. This power compensation signal is supplied to a first input of the adder 83 described above.

This power compensation calculator 93 acts on DC voltage control of the DC link of the inside of the converter 2 according to the converter control unit 8 such that a variation of a DC voltage of the DC link of the inside of the converter 2 is compensated for using information of the operation state of the inverter 4. This compensation becomes a feed forward element based on the operation state of the inverter 4. For example, this power compensation calculator 93 injects a feed-forward compensation to a control system of converter control responsible for DC voltage control such that a large drop in the DC voltage is inhibited when a large variation in the load 6 occurs. Since the compensation according to this power compensation calculator 93 is added to a result of DC voltage control of the converter control unit 8, it is necessary to cause the amount of compensation to be appropriate.

In addition, a part of the control device 10, for example, may be realized by hardware such as a central processing unit (CPU) expanding a program stored in a storage device or sequentially reading and executing each step of a program and the like. In such a case, some or all of the constituent elements described above are a part of a program executed by the CPU. For example, in a case in which an operation of the control device 10 is executed and realized by a CPU, programs of the converter control unit 8 and the inverter control unit 9 may be configured to be executed by a common CPU or may be configured to be executed by CPUs disposed in correspondence with the converter control unit 8 and the inverter control unit 9.

In addition, the control device 10 may be realized by a sequencer (it will be referred to as a programmable logic controller (PLC)). The converter control unit 8 and the inverter control unit 9 may be realized as parts of a program of a common PLC or may be realized by PLCs different from each other. This PLC may be formed using a semiconductor device such as a field programmable gate array (FPGA) or a combination of a plurality of semiconductor devices.

In accordance with a variation of the torque of the load 6, there may be an influence on a drive state of the motor 5. A case in which the influence due to a variation of the torque of the load 6 can be reduced will be described.

Figure 2:
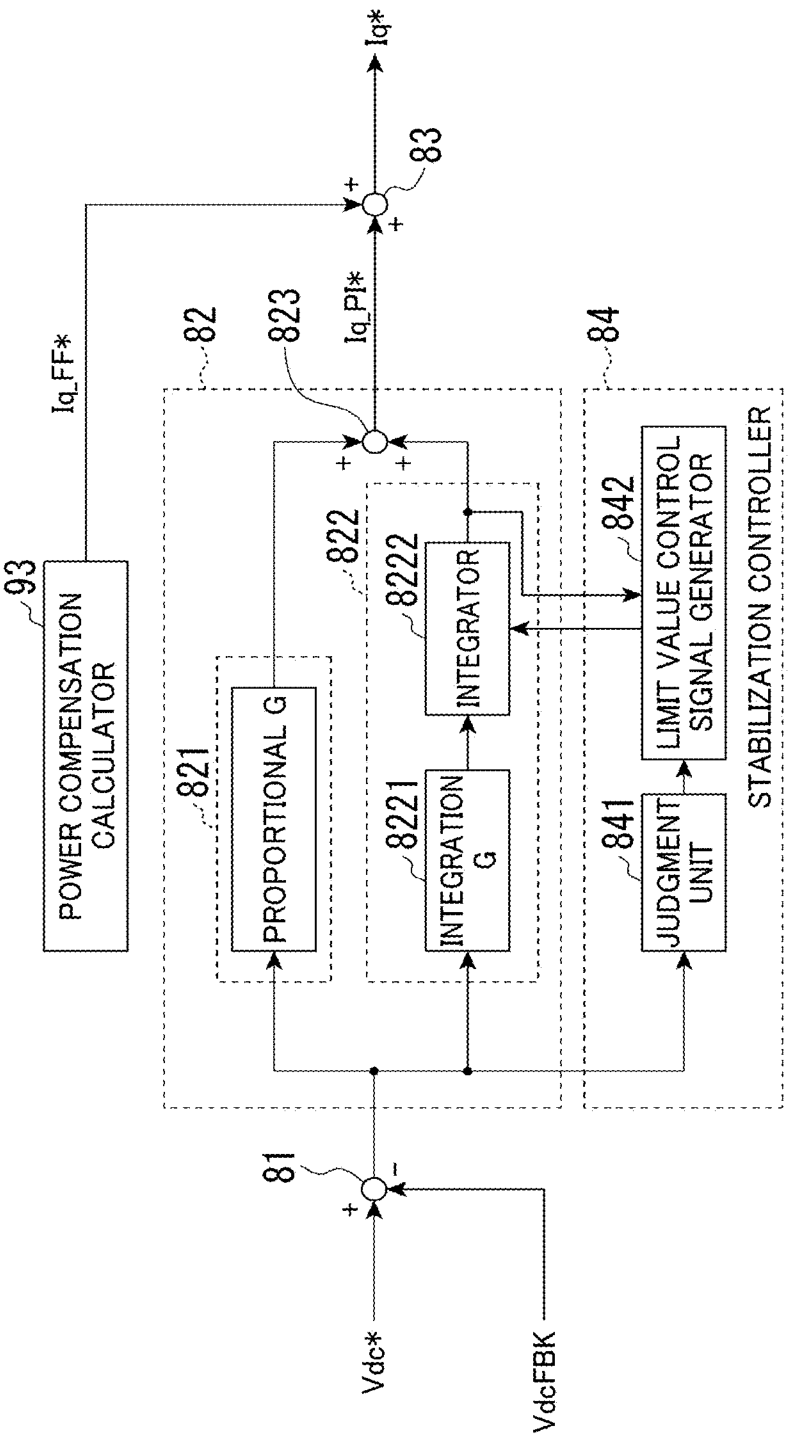
FIG. 2 is a diagram for describing current control in a converter 2 according to an embodiment.

FIG. 2 is a diagram for describing current control in a converter 2 according to an embodiment.

The DC voltage controller 82 illustrated in this FIG. 2 includes a proportional operation block 821, an integration operation block 822, and an adder 823.

The proportional operation block 821 multiplies a supplied voltage deviation ΔVdc by a predetermined proportional operation gain (a proportional G) and outputs a proportional operation component of the DC current reference.

The integration operation block 822 multiplies a supplied voltage deviation ΔVdc by a predetermined integration operation gain (an integration G) and outputs a result acquired by integrating this.

For example, the integration operation block 822 includes a multiplier 8221 and an integrator 8222. The multiplier 8221 multiplies a supplied voltage deviation ΔVdc by a predetermined integration operation gain and outputs a result thereof. The integrator 8222 integrates the output result acquired by multiplying the voltage deviation ΔVdc by the predetermined integration operation gain. The integrator 8222, for example, performs a numerical value integration operation, and a result of the numerical value integration operation is maintained for a predetermined time. As a result, the integration operation block 822 acquires an integrated value of the output result acquired by multiplying the voltage deviation ΔVdc by the predetermined integration operation gain. This integrated value becomes an integration operation component of the DC current reference.

In addition, the integrator 8222 according to an embodiment, for example, is formed to receive supply of a clear signal and clear the integrated value thereof to be zero under control from the outside.

By illustrating one example more specifically, a method for clearing the integrated value thereof will be described.

A range allowing variations in the output amplitude is set in the integrator 8222. The range allowing variations in the output amplitude is configured to be able to be changed in accordance with control from the outside.

For example, the integrator 8222 outputs an output signal entering the range of a lower limit value to an upper limit value as it is and outputs an output signal beyond the range with being limited to the lower limit value or the upper limit value thereof. In addition, by changing one of the upper limit value and the lower limit value of the range to 0 in a primary level, the integrated value can be forcedly limited to 0 in accordance with the change. By using this structure, the integrator 8222 may set the integrated value to 0. For example, when the integrated value is negative, in a case in which the lower limit value of the range allowing variations of the output amplitude is changed to 0, the integrator 8222 sets the integrated value to 0. In addition, when the integrated value is positive, even in a case in which the lower limit value of the range allowing variations of the output amplitude is changed to 0 as described above, there is no influence on the operation of the integrator 8222 in accordance with this. This similarly applies also to a case in which the upper limit value of the range allowing variations of the output amplitude is set to 0. In accordance with this, the integrator 8222 is cleared in accordance with the voltage deviation ΔVdc and the polarity of the integrated value (integration term). In accordance with this, the response of the integrator 8222 at the time of clearing is configured to be quicker than the response of an integrator having no clearing function.

As described above, by setting the upper limit value and the lower limit value of the range allowing variations in the output amplitude to 0 in the integrator 8222 continuously for a predetermined period, in a period in which one of the upper limit value and the lower limit value is set to 0, even when an abnormal operation that is beyond this limit value is generated, an effect of this can be inhibited.

In addition, a technique used for the integrator 8222 to clear the integrated value is not limited to this technique, and an appropriate technique can be selected. For example, the value of a variable representing an integrated value may be directly changed to 0.

The adder 823 adds a proportional operation component of the DC current reference and an integration operation component of the DC current reference and calculates a DC current reference used for DC voltage control of the DC link.

Such a DC voltage controller 82 may include a monitor monitoring a state of an output signal and a limiter (an anti-overshoot function) used for securing stability of an output signal. These detect or inhibit unstable states of an excessive output signal and an output signal, and an output signal allowed in this embodiment is formed to have a relatively small amplitude and thus is frequently judged not to be in an abnormal state when it is in a normal-time state.

The stabilization controller 84 includes a judgment unit 841 and a limit value control signal generator 842.

The judgment unit 841 judges the magnitude of the supplied DC voltage deviation ΔVdc and outputs a judgment result thereof as a logic value.

For example, the judgment unit 841 outputs "1" in a case in which the value of the DC voltage deviation ΔVdc is larger than a threshold $V_{THP}$ having a positive value, outputs "−1" in a case in which the value of the DC voltage deviation ΔVdc is smaller than a threshold $V_{THN}$ having a negative value, and outputs "0" otherwise.

The threshold $V_{THP}$ and the threshold $V_{THN}$ described above are set to a value "0" or a value near 0 in advance. For example, the threshold $V_{THP}$ may be set to "+1%", and the threshold $V_{THN}$ may be set to "−1%".

The limit value control signal generator 842 detects a change of the output of the judgment unit 841 and generates a limit value control signal. The limit value control signal generator 842 may judge the polarity of a value of the integrated output of the integrator 8222 and limit the output of the limit value control signal on the basis of a result thereof.

For example, the limit value control signal generator 842 outputs "1" in a case in which the value of the DC voltage deviation ΔVdc is larger than the threshold $V_{THP}$ having the positive value, and the value of the integration output is negative, outputs "−1" in a case in which the value of the DC voltage deviation ΔVdc is smaller than the threshold $V_{THN}$ having the negative value, and the value of the integration output is positive, and outputs "0" otherwise.

The integration operation block 822 has predetermined integration characteristics that are determined using an integration gain (an integration G) and a product/sum operation. The integration operation block 822 performs an integration operation for the DC voltage deviation ΔVdc relating to DC voltage control. A relation of the DC voltage deviation ΔVdc is represented in Equation (1).

$$\Delta Vdc = (\text{integration } G) \times (Vdc^* - Vdc FBK) \quad (1)$$

In addition, the integrator 8222 according to the embodiment performs the following initialization control on the basis of a judgment result acquired by the judgment unit 841.

The integrator 8222 detects a change of the output from the judgment unit 841 described above (it will be referred to as polarity judgment) from "0" to "1" or "0" to "−1" and sets the value of the maintained integration result to "0" in accordance with the detection.

In this way, in a case in which predetermined conditions relating to the magnitude of the DC voltage deviation ΔVdc and a result of the integration operation are satisfied, the stabilization controller 84 changes the result of the integration operation to a value "0" smaller than the absolute value of the result of the integration operation.

By referring to FIGS. 3 to 6, control using the control device 10 according to the embodiment will be described.

Figure 3:
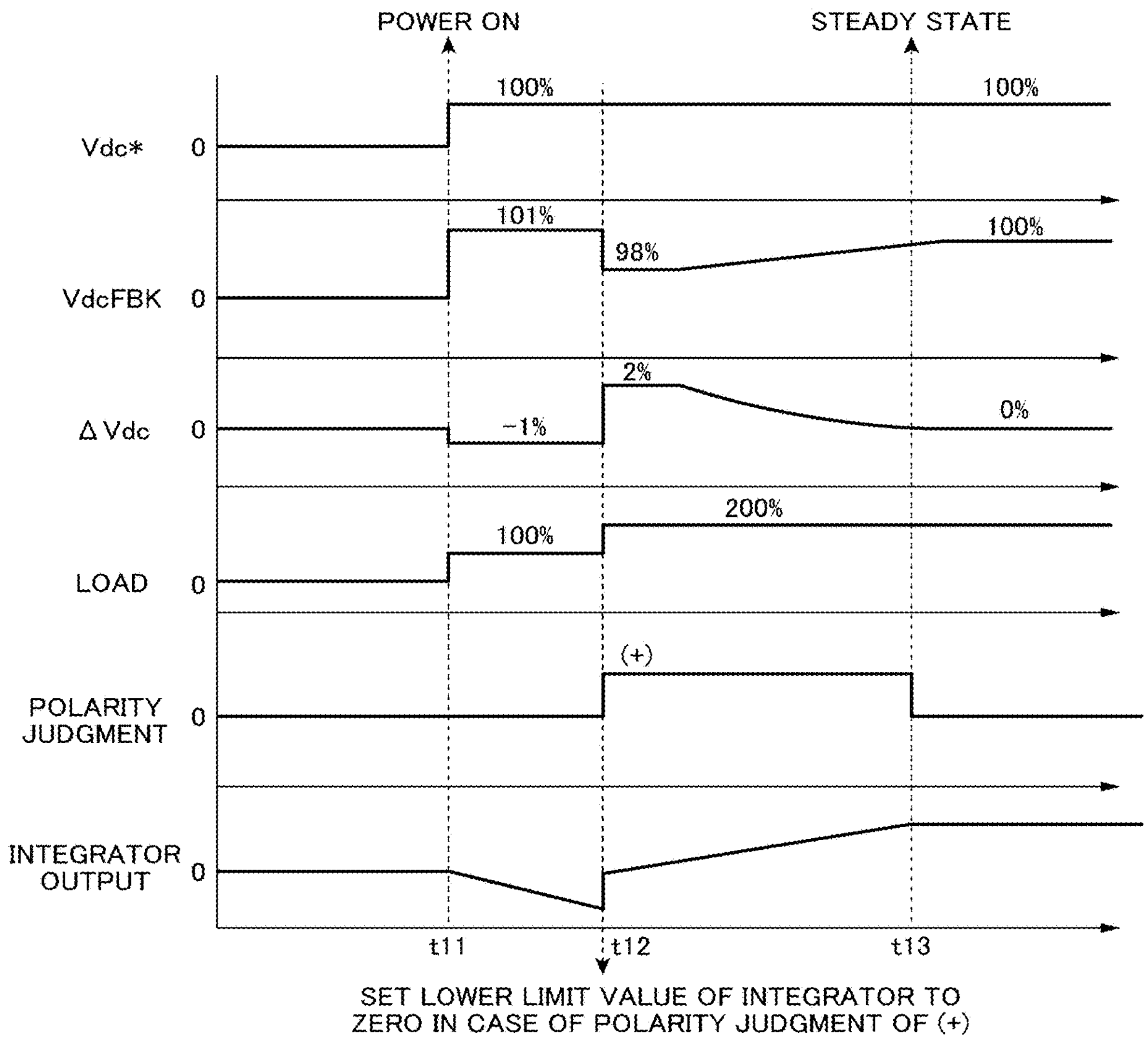
FIG. 3 is a diagram for describing an overview of control performed by a control device 10 according to an embodiment.
Figure 4:
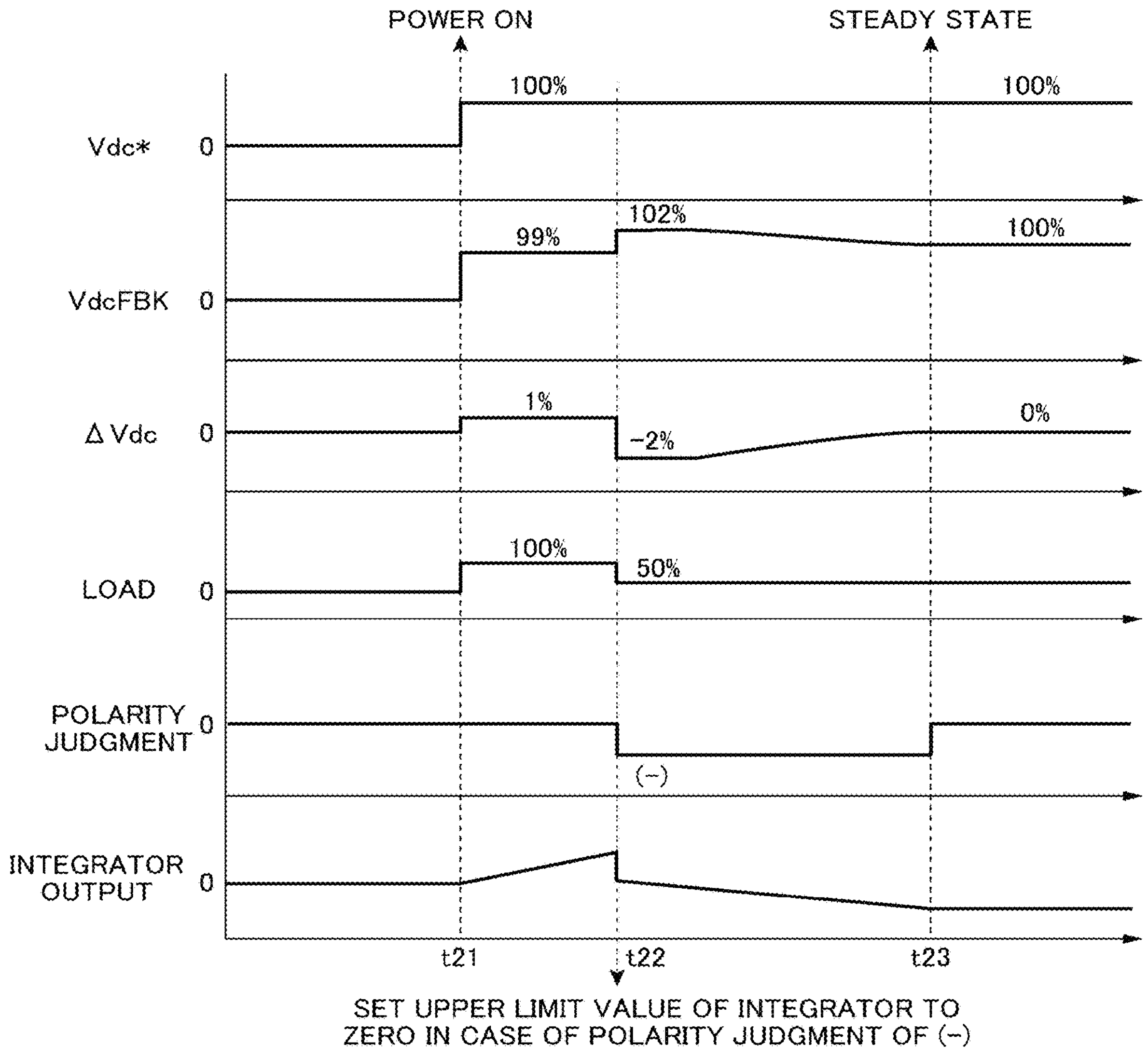
FIG. 4 is a diagram for describing an overview of control performed by the control device 10 according to the embodiment.

FIGS. 3 and 4 are diagrams for describing an overview of control using the control device 10 according to the embodiment.

In timing diagrams illustrated in FIGS. 3 and 4, from each top end side thereof, a DC voltage reference Vdc*, a DC voltage feedback VdcFBK, a DC voltage deviation ΔVdc, a load rate, a polarity judgment result, and an integrator output are represented.

In this embodiment, a rated value of the DC voltage reference Vdc* is represented as 100%. For example, a variation range of the DC voltage reference Vdc* is assumed to be values between 0 to 100%. A rated value of the DC voltage feedback VdcFBK is represented as 100%. The value of the DC voltage feedback VdcFBK may have a value exceeding the rating in a range in which there is no problem in maintaining safety and quality. The DC voltage deviation ΔVdc represents a value acquired by subtracting the DC voltage feedback VdcFBK from the DC voltage reference Vdc* described above. The rating of the load rate is represented as 100%. For example, a variation range of the load rate is assumed to have values between 0 to 100%. As the polarity judgment result, a result of judgment based on a predetermined judgment criterion for the DC voltage deviation ΔVdc and the integrator output is denoted as one of three values of −1, 0, and +1. The integrator output represents a result of an integration operation performed by the integrator 8222.

Waveforms illustrated in these FIGS. 3 and 4 illustrate examples modeled for simplifying description of operations. As will be described below, actual waveforms are more complicated waveforms.

In addition, as thresholds used for judgment of polarity identification, a first threshold $V_{THP}$ having a positive value is set as 1%, and a second threshold $V_{THN}$ having a negative value is set as −1%. These thresholds are examples but are not limited to these and may be changed appropriately.

In an initial stage corresponding to a start point of this timing diagram, the DC voltage reference Vdc* is set as 0%, and the motor 5 is controlled to be in a stop state. Each of the values of the load rate and the DC voltage feedback VdcFBK is 0%, and it can be understood that a state in which regenerated electric power is not generated is formed. In other words, the motor 5 can be regarded to have stopped. Since the DC voltage deviation ΔVdc of this state is 0%, the integrator output is 0 as well.

First, a first event illustrated in FIG. 3 and a response operation for this will be described. In the first event, a process in which the load rate suddenly increases is included.

At a time t11, the DC voltage reference Vdc* rises from 0% to 100%, and the motor 5 is started and is instructed to perform a rated operation. The load rate of this case is set as 100%. In accordance with this, the value of the DC voltage feedback VdcFBK is set to 101%. The DC voltage deviation ΔVdc of this state is 1%, the integrator output takes a negative value, and an absolute value thereof gradually increases. In other words, a decrease in the integrator output is continued.

In addition, polarity judgment of this stage is maintained to be 0 due to being in the following status.

Although the value of the result of the integration operation (integration output) is negative, the value of the DC voltage deviation ΔVdc is not larger than the first threshold $V_{THP}$ having the positive value, and thus polarity judgment becomes 0.

At a time t12, the load varies, and the load rate suddenly increases to 200% in a stepped pattern. Although the DC voltage reference Vdc* is maintained at 100%, the value of the DC voltage feedback VdcFBK falls to 98%. As a result, the DC voltage deviation ΔVdc of this state increases to 2%.

In addition, polarity judgment of this stage is in the following status and becomes +1.

Since the value of the result of the integration operation (integration output) until the load rate suddenly changes is negative, and the value of the DC voltage deviation ΔVdc becomes larger than the first threshold $V_{THP}$ having the positive value, the stabilization controller 84 sets the polarity judgment to +1.

In accordance with this, the integrator output is cleared by the integrator 8222. Thereafter, the integration using the integrator 8222 is restarted, and the integrator output takes a positive value, and an absolute value thereof gradually increases. After the clearing described above, as described above, although the value of the integration output becomes positive, the value of the DC voltage deviation ΔVdc is not smaller than the second threshold $V_{THN}$ having the negative value, and thus the integrator output is not continuously cleared.

Thereafter, although the load rate is maintained at 200%, the amount of compensation increases in accordance with an increase in the absolute value of the integration output, and thus the value of the DC voltage feedback VdcFBK gradually increases from 98% toward 100%. In accordance with this, the DC voltage deviation ΔVdc gradually decreases from 2% toward 0%.

When it becomes a time t13, the DC voltage deviation ΔVdc becomes smaller than the first threshold $V_{THP}$ having the positive value, and thus the stabilization controller 84 sets the polarity judgment to 0. Also thereafter, the trend of decreasing the DC voltage deviation ΔVdc is continued. In accordance with the decrease of the value of the DC voltage deviation ΔVdc, the change of the value of the integration output that is a result of the integration operation becomes small.

In this way, for a sudden increase of the load occurring at the time t12, the control device 10 of the power conversion device 100 can make a response to the sudden increase while a state of abnormally stopping the power conversion device 100 is avoided.

Next, a second event illustrated in FIG. 4 and a response operation for this will be described. In the second event, a process in which the load rate suddenly decreases is included.

At a time t21, the DC voltage reference Vdc* rises from 0% to 100%, and the motor 5 is started and is instructed to perform a rated operation. The load rate of this case is set as 100%. In accordance with this, the value of the DC voltage feedback VdcFBK is set to 99%. The DC voltage deviation ΔVdc of this state is 1%, the integrator output takes a positive value, and an absolute value thereof gradually increases. In other words, an increase in the integrator output is continued.

In addition, polarity judgment of this stage is maintained to be 0 due to being in the following status.

Although the value of the result of the integration operation (integration output) is positive, the value of the DC voltage deviation ΔVdc is not larger than the first threshold $V_{THP}$ having the positive value, and thus polarity judgment becomes 0.

At a time t22, the load varies, and the load rate suddenly decreases to 50% in a stepped pattern. Although the DC voltage reference Vdc* is maintained at 100%, the value of the DC voltage feedback VdcFBK increases to 102%. As a result, the DC voltage deviation ΔVdc of this state decreases to −2%.

In addition, polarity judgment of this stage is in the following status and becomes −1.

Since the value of the result of the integration operation (integration output) until the load rate suddenly changes is negative, and the value of the DC voltage deviation ΔVdc becomes smaller than the second threshold $V_{THN}$ having the negative value, the stabilization controller 84 sets the polarity judgment to −1.

In accordance with this, the integrator output is cleared by the integrator 8222. Thereafter, the integration using the integrator 8222 is restarted, and the integrator output takes a negative value, and an absolute value thereof gradually increases. After the clearing described above, as described above, although the value of the integration output becomes negative, the value of the DC voltage deviation ΔVdc is not smaller than the second threshold $V_{THN}$ having the negative value, and thus the integrator output is not continuously cleared.

Thereafter, although the load rate is maintained at 50%, the amount of compensation increases in accordance with an increase in the absolute value of the integration output, and thus the value of the DC voltage feedback VdcFBK gradually decreases from 102% toward 100%. In accordance with this, the DC voltage deviation ΔVdc gradually increases from −2% toward 0%.

When it becomes a time t23, the DC voltage deviation ΔVdc becomes larger than the second threshold $V_{THN}$ having the negative value, and thus the stabilization controller 84 sets the polarity judgment to 0. Also thereafter, the trend of increasing the DC voltage deviation ΔVdc is continued. In accordance with the decrease of the absolute value of the DC voltage deviation ΔVdc, the change of the value of the integration output that is a result of the integration operation becomes small.

In this way, for a sudden decrease of the load occurring at the time t22, the control device 10 of the power conversion device 100 can make a response to the sudden decrease while a state of abnormally stopping the power conversion device 100 is avoided.

Figure 5:
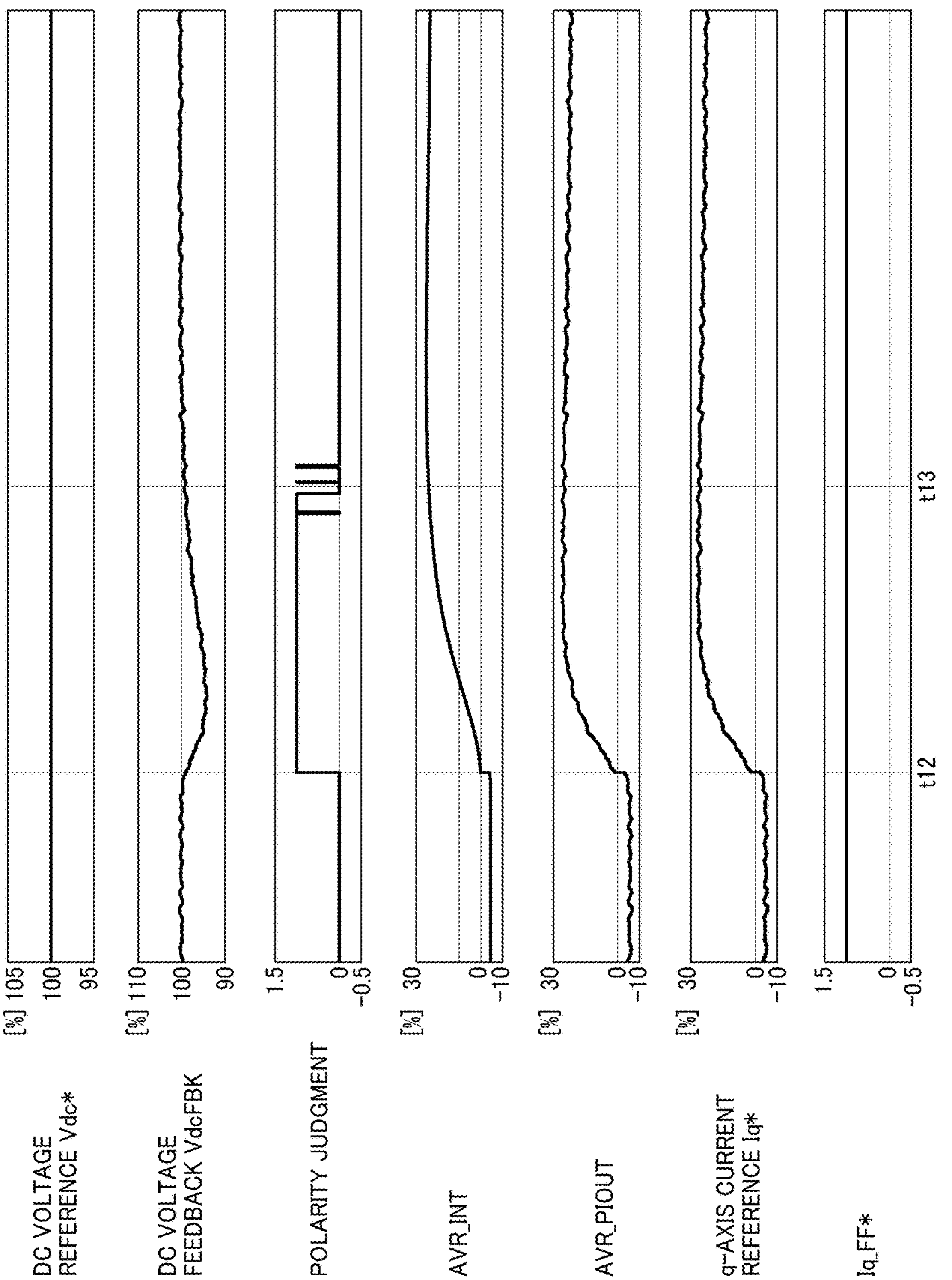
FIG. 5 is a diagram for describing a more specific case than the embodiment.
Figure 6:
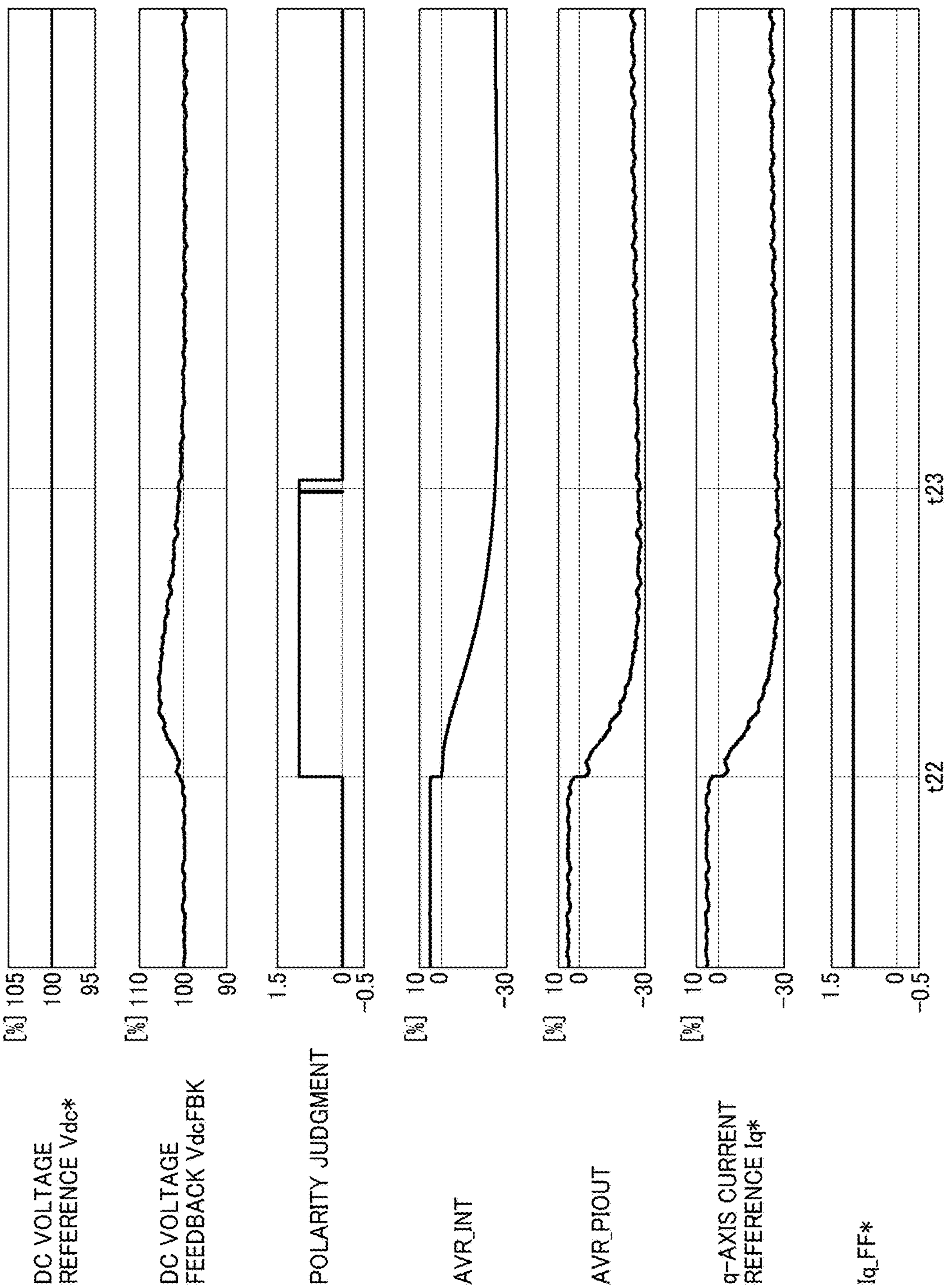
FIG. 6 is a diagram for describing a more specific case than the embodiment.

FIGS. 5 and 6 are diagrams for describing a more specific case than the embodiment.

FIG. 5 is a diagram for more specifically describing operations near the time t12 represented in FIG. 3. FIG. 6 is a diagram for more specifically describing operations near the time t22 represented in FIG. 4.

In timing diagrams illustrated in FIGS. 5 and 6, from each top end side thereof, a DC voltage reference Vdc*, a DC voltage feedback VdcFBK, a polarity judgment, an integrator output (AVR_INT), a PI output (AVR_PIOUT), a q-axis current reference Iq*, and a compensation amount adjustment signal (Iq_FF*) are represented.

A difference between a waveform illustrated in FIG. 5 and a waveform illustrated in FIG. 3 is that the waveform illustrated in FIG. 3 has been simulated using modeling, and the waveform illustrated in FIG. 5 has been observed during an actual operation.

In the case of an actual operation, it is difficult to generate a state change having a step shape in each signal, and thus the rising edge of the waveform is formed to be gentle. In accordance with this influence, it can be read that the DC voltage feedback VdcFBK changes more gently than the waveform illustrated in FIG. 3.

In addition, in accordance with the DC voltage feedback VdcFBK changing more gently than the waveform illustrated in FIG. 3, the value of the DC voltage deviation ΔVdc not illustrated in the drawing sequentially changes. In accordance with this, the waveform of the integrator output (AVR_INT) changes on not a straight line but a curved line.

A variation corresponding to a component of a relatively high frequency superimposed onto the DC voltage feedback VdcFBK is superimposed onto the PI output (AVR_PIOUT) and the q-axis current reference Iq*.

In addition, the compensation amount adjustment signal (Iq_FF*) has a fixed value of "1". In a case in which the magnitude of the compensation amount is configured to be able to be adjusted, by adjusting this value, the magnitude of the compensation amount can be adjusted.

As described above, although there is a detailed difference between the waveforms, the basic operations described with reference to FIGS. 3 and 4 can be checked using these FIGS. 5 and 6.

The control device 10 according to the embodiment described above is a control device of the power conversion device 100 acquired by combining a converter 2 converting an AC power into a DC power and an inverter 4 converting a DC power into an AC power. The control device 10 includes a DC voltage controller 82, a power compensation calculator 93, a current controller 85, and a stabilization controller 84. The DC voltage controller described above performs a proportional operation and an integration operation for a DC voltage deviation ΔVdc that is a deviation between a DC voltage detection value VdcFBK relating to a DC voltage of the DC side of the converter 2 and the DC voltage reference Vdc* of the DC side and generates an output value using results of the proportional operation and the integration operation described above. The power compensation calculator 93 adjusts a compensation amount used for inhibiting variations of the DC voltage using a request output value of the inverter 4. The current controller 85 controls the amount of conversion of the converter 2 using a calculation result based on the generated output value and the adjusted compensation amount. In a case in which predetermined conditions relating to the magnitude of the DC voltage deviation ΔVdc and the result of the integration operation are satisfied, the stabilization controller 84 changes the result of the integration operation to a value of "0" smaller than the absolute value of the result of the integration operation. In accordance with this, the DC voltage of the power conversion device acquired by combining the converter and the inverter can be further stabilized.

According to this embodiment, even in a case in which an impact load is applied to a load, the DC voltage Vdc does not suddenly varies in accordance with the influence thereof, and the behavior of the converter control unit 8 can be inhibited from being unstable. In accordance with this, the variation of the DC voltage can be reduced, and the response of the control device 10 can be quickened.

In the case of the comparative example, when the DC voltage Vdc suddenly changes, there are cases in which a state in which control of the motor 5 becomes unstable is continued, or the driving is stopped.

In contrast to this, even when the DC voltage Vdc suddenly changes, the control device 10 can inhibit the control of the motor 5 from becoming unstable and inhibit the driving from being stopped.

In addition, the predetermined conditions described above may include the absolute value of the DC voltage deviation ΔVdc being larger than the first threshold $V_{THP}$ having a positive value, and the sign of the result of the moving average of the DC voltage deviation ΔVdc being the same sign over a predetermined period.

Second Embodiment

In the first embodiment, as one example of typical control, a case in which initialization control in which the value of the maintained integration result is set to "0" on the basis of the judgment result acquired by the judgment unit 841 is performed has been described. In this embodiment, a case in which a value set in accordance with the initialization control of an integration value is set to a small value other than "0" in place of "0" will be described.

For example, a value set in accordance with the initialization control of an integration value is set to a value smaller than the absolute value of the result of the integration operation at the time point (it will be referred to as an initial value δ). This initial value δ is a value other than "0".

In this case, the integrator 8222 detects a change of the output (polarity judgment) from the judgment unit 841 described above from "0" to "1" or "0" to "−1" and sets the value of the maintained integration result to the initial value δ in accordance with the detection.

As a result, the integrator 8222 integrates the DC voltage deviation ΔVdc to be the initial value δ.

In accordance with this, in a case in which predetermined conditions relating to the magnitude of the DC voltage deviation ΔVdc and the result of the integration operation are satisfied, the stabilization controller 84 can change the result of the integration operation to the initial value δ having a value smaller than the absolute value of the result of the integration operation.

By using a value near 0 as a value smaller than the absolute value of the result of the integration operation, in a case in which predetermined conditions similar to those described above are satisfied, the stabilization controller 84 may set the result of the integration operation to the value near 0 and cause the integration operation to be continued using the set value.

In accordance with this, also in the case of this embodiment, effects similar to those of the first embodiment can be acquired.

According to at least one embodiment described above, the control device is a control device of a power conversion device acquired by combining a converter converting an AC power to a DC power and an inverter converting a DC power into an AC power. The control device described above includes a DC voltage controller, a compensation calculator, a controller, and a stabilization controller. The DC voltage controller described above performs a proportional operation and an integration operation for a DC voltage deviation that is a deviation between a DC voltage detection value relating to the DC voltage of the DC side of the converter described above and a DC voltage reference of the DC side described above and generates an output value using results of the proportional operation described above and the integration operation described above. The compensation calculator described above adjusts a compensation amount used for inhibiting variations of the DC voltage described above using a request output value of the inverter. The control unit controls the amount of conversion in the converter described above using the operation result based on the generated output value described above and the adjusted compensation amount described above. In a case in which predetermined conditions relating to the magnitude of the DC voltage deviation described above and the result of the integration operation described above are satisfied, the stabilization controller changes the result of the integration operation described above to a value smaller than the absolute value of the result of the integration operation described above. In accordance with this, the DC voltage of the power conversion device acquired by combining the converter and the inverter can be further stabilized.

Although several embodiments of the present invention have been described, such embodiments are presented as examples and are not intended to limit the scope of the invention. These embodiments can be performed in other various forms, and various omissions, substitutions, and changes can be made in a range not being departed from the concept of the invention. These embodiments and modifications thereof belong to the scope and the concept of the invention and similarly belong to inventions described in the claims and a range of equivalency thereof.

Supplementary Note

[1] One aspect of the embodiment described above is a control device of a power conversion device acquired by combining a converter converting an AC power into a DC power and an inverter converting a DC power into an AC power.

This control device includes: a DC voltage controller performing a proportional operation and an integration operation for a DC voltage deviation that is a deviation between a DC voltage detection value relating to a DC voltage of a DC side of the converter and a DC voltage reference of the DC side and generating an output value using results of the proportional operation and the integration operation; a compensation calculator adjusting a compensation amount used for inhibiting variations of the DC voltage using a request output value of the inverter; a controller controlling an amount of conversion in the converter using the operation results based on the generated output value and the adjusted compensation amount; and a stabilization controller changing the result of the integration operation to a value smaller than an absolute value of the result of the integration operation in a case in which predetermined conditions relating to a magnitude of the DC voltage deviation and the result of the integration operation are satisfied.

[2] In the control device described in [1] described above, by using 0 or a value near 0 as the value smaller than the absolute value of the result of the integration operation, the stabilization controller may set the result of the integration operation to 0 or the value near 0 and continue to perform the integration operation using the set value in a case in which the predetermined conditions are satisfied.

[3] In the control device described in [1] or [2] described above, the DC voltage controller integrates the deviation acquired by subtracting the DC voltage reference of the DC side from the DC voltage detection value. In this case, a sign of the result of the integration operation may coincide with a sign of a mean value of the deviation in positivity/negativity.

[4] In the control device described in [3] described above, as the predetermined conditions, satisfying of any one of a value of the DC voltage deviation ΔVdc being larger than a first threshold $V_{THP}$ having a positive value and a value of the result of the integration operation being negative and the value of the DC voltage deviation ΔVdc being smaller than a second threshold $V_{THN}$ having a negative value and the value of the result of the integration operation being positive may be included.

[5] In the control device described in [3] described above, as the predetermined conditions, an absolute value of the DC voltage deviation ΔVdc being larger than a first threshold $V_{THP}$ having a positive value and a sign of a result of a moving average of the DC voltage deviation ΔVdc being the same sign over a predetermined period may be included.

REFERENCE SIGNS LIST

100 Power conversion device
2 Converter
3, 3A, 3B Smoothing capacitor
4 Inverter
5 Motor
6 Load
7 DC voltage detector
8 Converter control unit
9 Inverter control unit
10 Control device
81 Subtractor
82 DC voltage controller
821 Proportional operation block
822 Integration operation block
83, 823 Adder
84 Stabilization controller
85 Current controller (controller)
841 Judgment unit
842 Limit value control signal generator
93 Power compensation calculator (compensation calculator)

The invention claimed is:

1. A control device of a power conversion device acquired by combining a converter converting an AC power into a DC power and an inverter converting a DC power into an AC power, the control device comprising:

a DC voltage controller performing a proportional operation and an integration operation for a DC voltage deviation that is a deviation between a DC voltage detection value relating to a DC voltage of a DC side of the converter and a DC voltage reference of the DC side and generating an output value using results of the proportional operation and the integration operation;

a compensation calculator adjusting a compensation amount used for inhibiting variations of the DC voltage using a request output value of the inverter;

a controller controlling an amount of conversion in the converter using the operation results based on the generated output value and the adjusted compensation amount; and a stabilization controller changing the result of the integration operation to a value smaller than an absolute value of the result of the integration operation in a case in which predetermined conditions relating to a magnitude of the DC voltage deviation and the result of the integration operation are satisfied.

2. The control device according to claim 1, wherein, by using 0 or a value near 0 as the value smaller than the absolute value of the result of the integration operation, the stabilization controller sets the result of the integration operation to 0 or the value near 0 and continues to perform the integration operation using the set value in a case in which the predetermined conditions are satisfied.

3. The control device according to claim 1, wherein the DC voltage controller integrates the deviation acquired by subtracting the DC voltage reference of the DC side from the DC voltage detection value, and wherein a sign of the result of the integration operation coincides with a sign of a mean value of the deviation in positivity/negativity.

4. The control device according to claim 3, wherein, as the predetermined conditions, satisfying of any one of a value of the DC voltage deviation ΔVdc being larger than a first threshold $V_{THP}$ having a positive value and a value of the result of the integration operation being negative and the value of the DC voltage deviation ΔVdc being smaller than a second threshold $V_{THN}$ having a negative value and the value of the result of the integration operation being positive is included.

5. The control device according to claim 3, wherein, as the predetermined conditions, an absolute value of the DC voltage deviation ΔVdc being larger than a first threshold $V_{THP}$ having a positive value and a sign of a result of a moving average of the DC voltage deviation ΔVdc being the same sign over a predetermined period are included.

6. A power conversion device including a set of a converter converting an AC power into a DC power and an inverter converting a DC power into an AC power, the power conversion device comprising:

a DC voltage controller performing a proportional operation and an integration operation for a DC voltage deviation that is a deviation between a DC voltage detection value relating to a DC voltage of a DC side of the converter and a DC voltage reference of the DC side and generating an output value using results of the proportional operation and the integration operation;

a compensation calculator adjusting a compensation amount used for inhibiting variations of the DC voltage using a request output value of the inverter;

a controller controlling an amount of conversion in the converter using the operation results based on the generated output value and the adjusted compensation amount; and a stabilization controller changing the result of the integration operation to a value smaller than an absolute value of the result of the integration operation in a case in which predetermined conditions relating to a magnitude of the DC voltage deviation and the result of the integration operation are satisfied.

7. A control method for a power conversion device including a set of a converter converting an AC power into a DC power and an inverter converting a DC power into an AC power, the control method comprising:

a process of performing a proportional operation and an integration operation for a DC voltage deviation that is a deviation between a DC voltage detection value relating to a DC voltage of a DC side of the converter and a DC voltage reference of the DC side and generating an output value using results of the proportional operation and the integration operation; adjusting a compensation amount used for inhibiting variations of the DC voltage using a request output value of the inverter; and controlling an amount of conversion in the converter using the operation results based on the generated output value and the adjusted compensation amount; and a process of changing the result of the integration operation to a value smaller than an absolute value of the result of the integration operation in a case in which predetermined conditions relating to a magnitude of the DC voltage deviation and the result of the integration operation are satisfied.

8. The control method according to claim 7, further comprising a process of, by using 0 or a value near 0 as the value smaller than the absolute value of the result of the integration operation, setting the result of the integration operation to 0 or the value near 0 and continuing to perform the integration operation using the set value in a case in which the predetermined conditions are satisfied.

9. The control method according to claim 8, further comprising: a process of integrating the deviation acquired by subtracting the DC voltage reference of the DC side from the DC voltage detection value, wherein a sign of the result of the integration operation coincides with a sign of a mean value of the deviation in positivity/negativity.

10. The control method according to claim 9, wherein, as the predetermined conditions, satisfaction of any one of a value of the DC voltage deviation ΔVdc being larger than a first threshold $V_{THP}$ having a positive value and a value of the result of the integration operation being negative and the value of the DC voltage deviation ΔVdc being smaller than a second threshold $V_{THN}$ having a negative value and the value of the result of the integration operation being positive is included.

* * * * *